United States Patent
Neupert

(10) Patent No.: US 6,802,534 B2
(45) Date of Patent: Oct. 12, 2004

(54) GAS BAG MODULE

(75) Inventor: Ralph Neupert, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 153 days.

(21) Appl. No.: 10/034,605

(22) Filed: Dec. 26, 2001

(65) Prior Publication Data

US 2002/0084638 A1 Jul. 4, 2002

(30) Foreign Application Priority Data

Dec. 28, 2000 (DE) ..................................... 200 22 020 U

(51) Int. Cl.[7] .............................................. B60R 21/16
(52) U.S. Cl. ................. 280/743.1; 280/743.2
(58) Field of Search .................... 280/728.1, 730.1, 280/743.2, 731, 732, 733, 743.1

(56) References Cited

U.S. PATENT DOCUMENTS

| | | | | | |
|---|---|---|---|---|---|
| 4,828,286 | A | * | 5/1989 | Fohl .......................... | 280/731 |
| 5,678,858 | A | * | 10/1997 | Nakayama et al. ...... | 280/743.2 |
| 5,887,894 | A | * | 3/1999 | Castagner et al. ....... | 280/743.2 |
| 6,361,072 | B1 | * | 3/2002 | Barnes ..................... | 280/743.1 |
| 6,536,800 | B2 | * | 3/2003 | Kumagai et al. ........ | 280/743.1 |
| 6,540,254 | B2 | * | 4/2003 | Bieber et al. ............. | 280/732 |
| 6,572,144 | B2 | * | 6/2003 | Igawa ....................... | 280/743.1 |
| 6,581,964 | B2 | * | 6/2003 | Braunschadel ........... | 280/743.2 |
| 6,595,549 | B2 | * | 7/2003 | Bohn et al. .............. | 280/743.1 |
| 2001/0042978 | A1 | | 11/2001 | Frisch | |
| 2001/0042979 | A1 | | 11/2001 | Frisch | |
| 2001/0052691 | A1 | | 12/2001 | Bieber et al. | |
| 2002/0030355 | A1 | | 3/2002 | Braunschadel | |

FOREIGN PATENT DOCUMENTS

| | | |
|---|---|---|
| DE | 3630685 A1 | 2/1988 |
| DE | 19749914 A1 | 2/1999 |
| DE | 20010726 U1 | 10/2000 |

* cited by examiner

*Primary Examiner*—Paul N. Dickson
*Assistant Examiner*—Toan To
(74) *Attorney, Agent, or Firm*—Tarolli, Sundheim, Covell & Tummino L.L.P.

(57) ABSTRACT

The invention relates to a gas bag module comprising a gas bag, an outer contour of the gas bag being defined by a gas bag wall which has a front wall for the impact of an occupant and a depression starting from the front wall. The depression is formed in that during inflation of the gas bag a center portion of the gas bag wall is prevented from freely moving and is restrained. The gas bag has around the depression a ring-shaped chamber to be filled with gas. At least one limiting strap is provided which engages the gas bag wall at a transition from the front wall to the depression, substantially extends alongside the depression and determines a depth of the depression.

11 Claims, 3 Drawing Sheets

GAS BAG MODULE

TECHNICAL FIELD

This invention relates to a gas bag module comprising a gas bag.

BACKGROUND OF THE INVENTION

Known gas bags have a gas bag wall which has a front wall for the impact of an occupant and a depression starting from the front wall, the depression being formed in that a center portion of the gas bag wall is prevented from a free or any movement during inflation and is restrained. The gas bag has around the depression a ring-shaped chamber to be filled with gas. With such ring-shaped gas bags, the center portion is prevented from moving towards the occupant in that it remains attached to the module. Restraint is effected via the ring-shaped front wall around the depression.

BRIEF SUMMARY OF THE INVENTION

The invention provides a gas bag module in which the depression is closed at least partly, preferably completely. This is achieved in a gas bag module which comprises a gas bag, an outer contour of the gas bag being defined by a gas bag wall which has a front wall for the impact of an occupant and a depression starting from the front wall. The depression is formed in that during inflation of the gas bag a center portion of the gas bag wall is prevented from a free or any movement and is restrained. The gas bag has around the depression a ring-shaped chamber to be filled with gas. At least one limiting strap is provided which engages the gas bag wall at a transition from the front wall to the depression, substantially extends alongside the depression and determines, i.e. defines a depth of the depression. While in gas bags known so far, the depression itself determines the depth of the gas bag, a limiting strap is provided close to the depression in the module proposed, which limiting strap limits the depth of the depression. This means that the portion of the gas bag wall bridged by the limiting strap is longer than the limiting strap itself, so that the limiting strap and not the gas bag wall in the region of the depression determines the depth thereof. The region of the gas bag wall which defines the depression will, however, bulge into the depression in the inflated condition, so that the depression has a smaller opening surface than without a corresponding limiting strap with otherwise identical geometries of the gas bag fabric. The term "completely closed" should not define that the depression is closed gas tight. Rather, portions of the gas bag wall are pressed against each other so that small openings having a few square millimeter cross area might remain instead of large openings having some square centimer cross area.

Preferably, the gas bag wall—in the region where it defines the depression—will even bulge to such an extent that portions of the gas bag wall contact each other, preferably opposite portions.

With the invention it is possible that the portions of the gas bag wall contacting each other will rest against each other such that the depression is substantially closed.

This closing of the depression is preferably effected close to the transition from the depression to the front wall, which can be achieved by an appropriate adjustment of the length of the limiting strap to the depth of the gas bag wall which forms the depression.

In accordance with one aspect of the invention, the limiting strap is attached to the front wall or to the region of the gas bag wall that defines the depression.

This attachment can, for instance, be effected as follows: The front wall and the region of the gas bag wall defining the depression preferably consist of fabric layers sewn to each other. At the seam connecting the fabric layers of the front wall and of the depression, the limiting strap is attached to the gas bag, so that with one seam three parts are connected, namely the fabric layers for the front wall and the depression as well as the limiting strap.

In accordance with another embodiment, in which front wall and depression likewise consist of various fabric layers, the fabric layer of the front wall has an opening for forming the transition to the depression. At least one fabric tab of the fabric layer of the front wall protruding into the opening is provided for the attachment of the limiting strap. This embodiment can for instance be realized in that a U-shaped slot is punched into the fabric layer of the front wall, the "U" circumscribing the fabric tab.

In accordance with the preferred embodiment, a plurality of limiting straps are provided, which are attached to the front wall and whose points of attachment to the front wall substantially define a plane in the inflated condition of the gas bag. In the inflated condition, the portion of the gas bag wall provided inwards of the points of attachment either lies in the plane or even protrudes from the plane, namely towards the occupant, i.e. opposite to the depression. This means that the gas bag has no funnel-shaped depression in the region of the transition from the front wall to the depression, but the gas bag rather faces the occupant as a planar, closed surface, where some kind of dome may even protrude from the plane.

Closing the depression close to the front wall may even be supported by an expedient cut of the fabric layer defining the front wall. It was found out that a circular opening provides such support less than e.g. a C-shaped, slotted, rectangular, triangular or oval opening. Even a cross-shaped opening or a T-shaped or H-shaped, slotted opening suitably supports closing near the front wall. Surprisingly, these various geometries of the opening are not even a hindrance during deployment of the gas bag. During deployment, the opening must be moved through a ring-shaped outlet opening in the module cover along a stationary middle portion to the outside.

With its end close to the gas bag module, with respect to the inflated condition of the gas bag, the limiting strap is attached to the center portion.

DETAILED DESCRIPTION OF THE PREFERRED EMBODIMENTS

Figure 1:
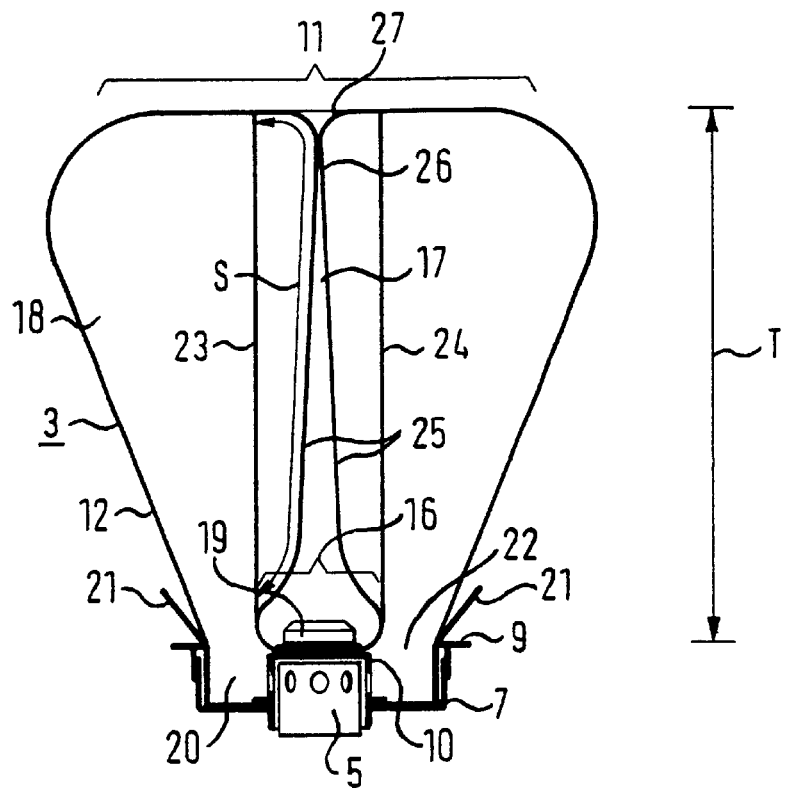
FIG. 1 shows a cross-sectional view of a gas bag module according to the invention, with the gas bag inflated.

FIG. 1 represents a gas bag module which has a gas bag 3, a gas generator 5 and a module housing 7 with a module cover 9. The gas generator 5 is surrounded by a pot- or bell-shaped diffuser 10, which has been put over the gas generator 5 from above and is attached to the module, to be more precise at the module housing 7.

The gas bag has a gas bag wall including several regions or portions, for instance a front wall 11 which faces the occupant in the inflated condition and restrains the same, as the occupant impacts onto it. The gas bag wall defines the outer contour of the inflated gas bag. Moreover, a rear wall 12 is provided. In the middle of the gas bag, i.e. in the center, a depression 17 extends from the front wall 11 towards the gas generator 5. The depression 17 is formed in that a portion of the outer gas bag wall, subsequently referred to as center portion 16, is prevented from moving out of the module in the case of restraint. As a result, a ring-shaped chamber 18 to be inflated and to be filled with gas is obtained. The depression 17, however, is not to be inflated.

The module cover 9 has a middle portion 19 which adjoins the center portion 16 and is permanently attached to the diffuser 10. For the attachment of this middle portion 19, a reinforcement sheet is provided inside the middle portion, from which reinforcement sheet threaded bolts protrude, which extend through the center portion 16 and the diffuser 10, so as to be screwed with nuts from below. As a result, the center portion 16 is positively attached to the diffuser and also frictionally clamped between the middle portion 19 and the diffuser 10.

In the folded condition, the gas bag 3 is accommodated in an annular space 20 between the diffuser 10 and an outer wall of the module housing 7. Moreover, the cover 9 has a ring-shaped cap 21 composed of segments, which cap covers a ring-shaped outlet opening 22 when the gas generator 5 is not yet activated.

In the interior of the chamber 18, there are provided two limiting straps 23, 24 disposed opposite each other with respect to the depression 17, which limiting straps extend from the front wall 11 as far as to the center portion 16 and are sewn to the front wall 11 and the center portion 16. The limiting straps 23, 24 are shorter than the length S of the part of the gas bag wall 25 bridged by them, so that in the inflated condition as shown in FIG. 1, the limiting straps 23, 24 are tensioned and determine the depth T of the depression and of the gas bag.

Due to the limiting straps 23, 24 extending alongside the depression 17, the part of the gas bag wall 25 defining the depression 17 can bulge towards the depression 17 to such an extent that portions 26 close to the transition 27 between the front wall 11 and the depression 17 contact each other, so that the depression is substantially completely closed from the outside. As a result, a substantially completely closed restraining surface is provided for the occupant.

Figure 2:
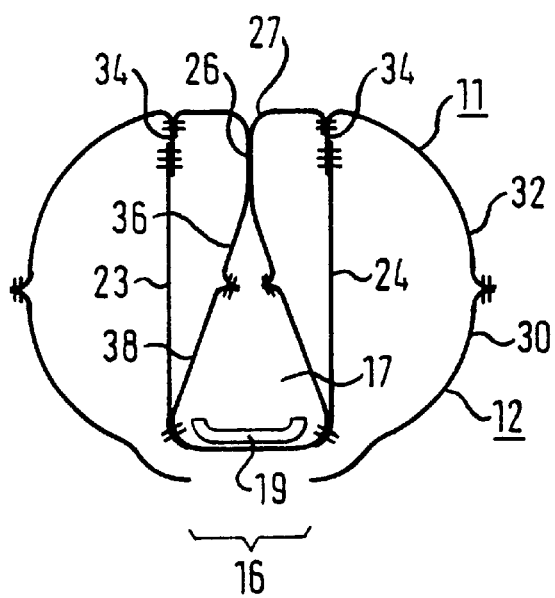
FIG. 2 shows a cross-sectional view of another embodiment, in which the attachment of the limiting straps is represented in greater detail.
Figure 3:
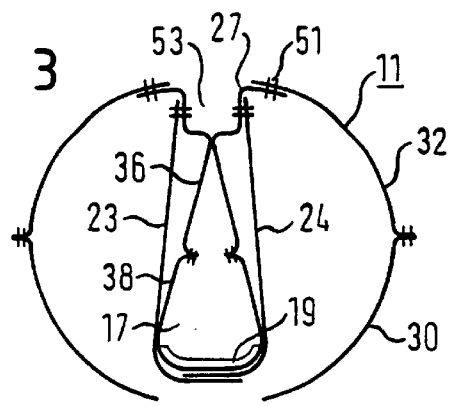
FIG. 3 shows a cross-sectional view in accordance with a further embodiment, in which the attachment of the limiting straps is represented in greater detail.
Figure 4:
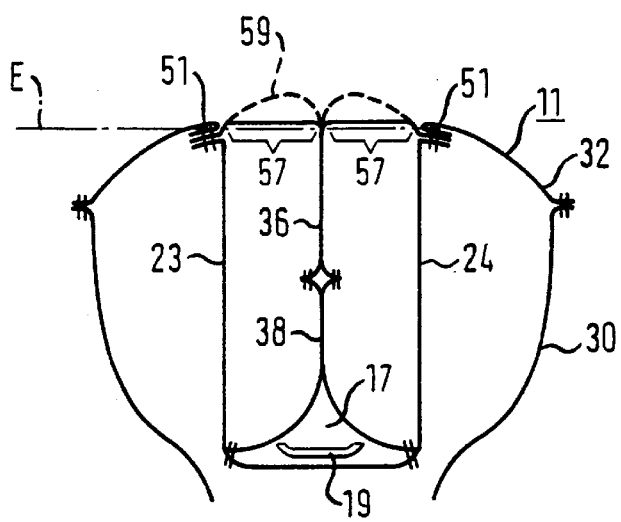
FIG. 4 shows a cross-sectional view of the gas bag in accordance with a fourth embodiment with a further variant of the attachment of the limiting straps.

FIGS. 2 to 4 in particular refer to the attachment of the limiting strap to the gas bag wall.

In the embodiment as shown in FIG. 2, the gas bag consists of four ring-shaped fabric layers. A first fabric layer 30 above all forms the rear wall 12. A second fabric layer 32 in particular forms the front wall 11. The fabric layer 32 has a centric opening, which is formed in that an H-shaped slot is cut into the fabric layer 32. There are obtained two substantially square fabric tabs 34, which in the inflated condition project towards the gas generator, and to each of which a limiting strap 23, 24 is sewn. To the edge of the opening in the fabric layer 32 there is likewise sewn a ring-shaped fabric layer 36, so that the opening is closed to the outside. The fabric layer 36 forms the upper part of the depression 17. The outer edge of a fabric layer 38, which is likewise ring-shaped, is in turn sewn to the inner edge of the fabric layer 36. The fabric layer 38 extends as far as to below the middle portion 19 and includes the center portion 16. The lower ends of the limiting straps 23, 24 are sewn to the fabric layer 38 in the region of the center portion 16.

Figure 5:
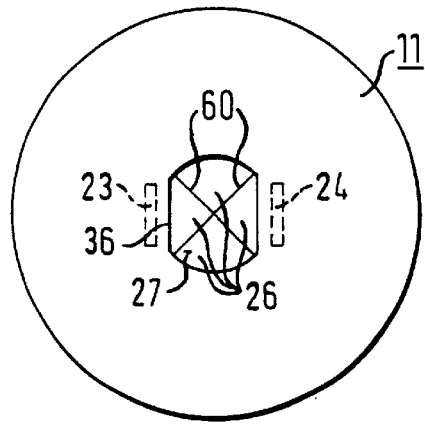
FIG. 5 shows a top view of the inflated gas bags as shown in FIGS. 2 to 4, and FIGS. 6a to 6f show top views of various embodiments of the gas bag in accordance with the gas bag module according to the invention, with various cuts of the front wall.

In the inflated condition, the opening in the fabric layer 32 is closed in that the fabric layer 36 bulges radially to the inside and in part also to the top, so that portions 26 of the fabric layer 36 rest against each other and close the depression 17, as is shown in FIG. 5. In FIG. 5, the limiting straps 23, 24 are also represented in broken lines. The embodiments in accordance with FIGS. 3 and 4 substantially correspond to the embodiment shown in FIG. 2, so that only the differences will be discussed. As shown in FIG. 3, the fabric layer 32 has an oval, rectangular or slotted opening to whose edge the fabric layer 36 is sewn. The limiting straps 23, 24 are then attached to the fabric layer 36 at a distance from the surrounding seam 51. In accordance with this embodiment, there is obtained a relatively small depression 53 in the region of the front wall which for better clarity is represented exaggeratedly deep in FIG. 3. The limiting straps 23, 24 extend as far as to below the middle portion 19 and completely overlap each other in this region and are sewn to the fabric layer 38 also below the middle portion.

In the embodiment as shown in FIG. 3, the limiting straps 23, 24 are thus attached to the gas bag wall defining the depression 17, but still directly at the transition 27 from the front wall 11 to the depression 17.

In the embodiment as shown in FIG. 4, not only the fabric portions 32 and 36 are sewn to each other by the surrounding seam 51, but at the same time the limiting straps 23, 24 are sewn to the gas bag wall. In this embodiment, however, the limiting straps 23, 24 are integrally connected with each other below the middle portion 19, i.e. a long strip of fabric is provided, both ends of which form the limiting straps 23, 24. In this embodiment, the depression 17 can be closed almost over the entire depth T, since the gas bag wall can bulge to the inside to such an extent that portions of the gas bag wall rest against each other over a large surface. The ring-shaped front wall 11 is thereby completely closed. The particularity of this feature is that contrary to FIG. 3 no depression 53 is formed, but in the inflated condition of the gas bag the portions 57 of the fabric layer 36 rather lie outside a plane E which is defined by the points of attachment 51 of the limiting straps 23, 24 to the front wall 11. In the region of the portions 57 the gas bag thus bulges to the outside in the direction towards the occupant, opposite to the depression 17, or it lies in the plane E.

The illustrated form can also be extended such that, as shown in broken lines, a surrounding bead 59 can be formed. With a view to the front wall 11, the gas bag presents itself to the occupant as a closed impact surface, and only in the middle folds 60 can be seen, with portions 26 of the gas bag wall, which defines the depression, resting against each other.

FIGS. 6a to 6g represent various blanks of the fabric layer 32, which forms the front wall 11, as well as the position of the limiting straps 23, 24. Moreover, in the inflated condition the openings will be much smaller than in the blanks illustrated.

Figure 6A:
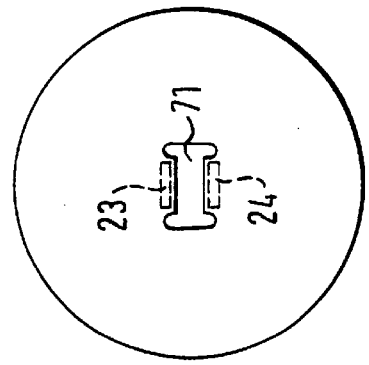

FIG. 6a represents an H-shaped opening 71, from which the depression extends to the inside.

Figure 6B:
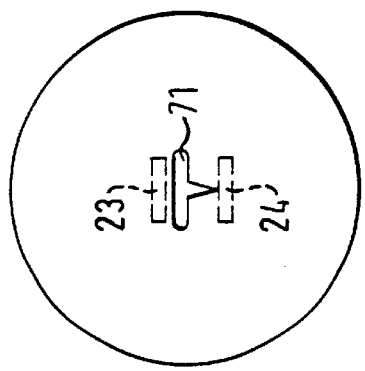

In the embodiment as shown in FIG. 6b, a T-shaped opening 71 is provided.

Figure 6C:
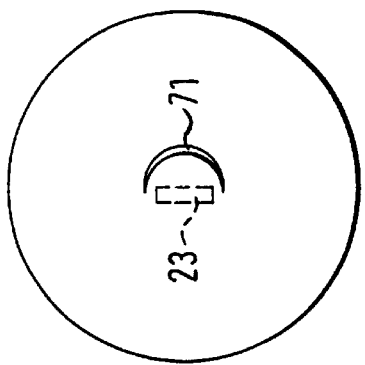

FIG. 6c shows a C-shaped opening 71, which can also be closed by only one limiting strap 23, where appropriate.

Figure 6D:
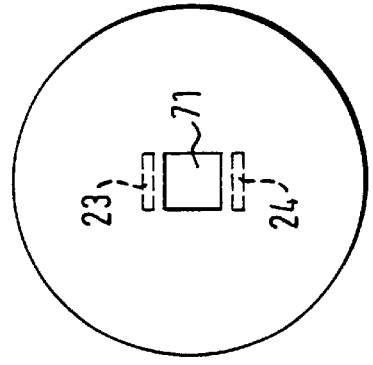
Figure 6E:
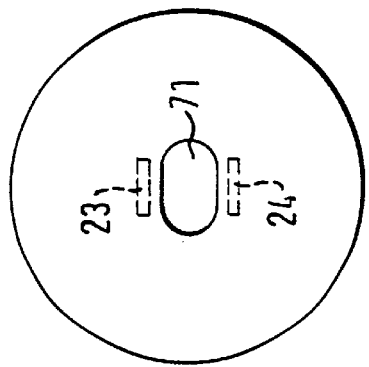
Figure 6F:
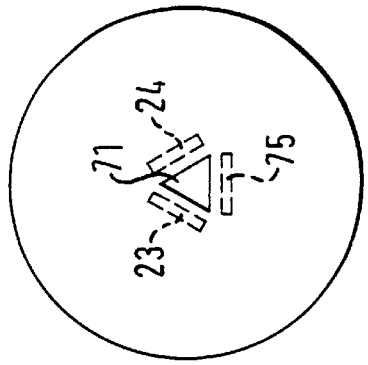

In the embodiment as shown in FIG. 6d, a square opening 71 is provided, and in the embodiment as shown in FIG. 6e an oval opening 71. FIG. 6f shows a triangular opening 71 and three limiting straps 23, 24, 75, which are arranged at an angle of 120° with respect to each other.

What is claimed is:

1. A gas bag module comprising a gas bag, an outer contour of said gas bag being defined by a gas bag wall which has a front wall for the impact of an occupant and a depression starting from said front wall, said depression being formed in that during inflation of said gas bag a center portion of said gas bag wall is prevented from freely moving and is restrained, said gas bag having around said depression a ring-shaped chamber to be filled with gas, at least one limiting strap being provided which engages said gas bag wall at a transition from said front wall to said depression, substantially extends alongside said depression and determines a depth of said depression.

2. The gas bag module as claimed in claim 1, wherein said gas bag wall, in a region where it defines said depression, bulges to such an extent that portions of said gas bag wall of said inflated gas bag contact each other.

3. The gas bag module as claimed in claim 2, wherein said portions of said gas bag wall contacting each other rest against each other such that said depression is closed.

4. The gas bag module as claimed in claim 3, wherein said depression is closed in a region of transition to said front wall.

5. The gas bag module as claimed in claim 1, wherein said limiting strap is attached to one of said front wall and said region of said gas bag wall that defines said depression.

6. The gas bag module as claimed in claim 5, wherein said front wall and said region of said gas bag wall defining said depression consist of fabric layers that are sewn to each other, and wherein said limiting strap is attached to said gas bag at a seam that connects said fabric layers of said front wall and of said depression.

7. The gas bag module as claimed in claim 5, wherein said front wall and said region of said gas bag wall defining said depression consist of fabric layers sewn to each other, and wherein said fabric layer of said front wall has an opening for forming said transition to said depression, at least one fabric tab being provided which protrudes into said opening for attaching said limiting strap.

8. The gas bag module as claimed in claim 1, wherein a plurality of limiting straps are provided, which are attached to said front wall and whose points of attachment at said front wall define a plane in said inflated condition of said gas bag, a portion of said gas bag wall that is provided inwards of said points of attachment lying in said plane.

9. The gas bag module as claimed in claim 1, wherein a plurality of limiting straps are provided, which are attached to said front wall and whose points of attachment at said front wall define a plane in said inflated condition of said gas bag, a portion of said gas bag wall that is provided inwards of said points of attachment protruding from said plane to the outside in a direction opposite to said depression.

10. The gas bag module as claimed in claim 1, wherein said front wall and said region of said gas bag wall defining said depression consist of fabric layers sewn to each other, and wherein for forming said transition to said depression said fabric layer forming said front wall has one of a C-shaped, slotted, rectangular, triangular, oval, cross-shaped, T-shaped and H-shaped opening.

11. The gas bag module as claimed in claim 1, wherein said limiting strap is attached to said center portion with an end that lies closer to said gas bag module.

\* \* \* \* \*